US011726380B1

(12) United States Patent
Oh et al.

(10) Patent No.: US 11,726,380 B1
(45) Date of Patent: Aug. 15, 2023

(54) ADVANCED E-SHUTTER SYSTEM WITH E-INK LAYER FOR EMBEDDED CAMERA DISPLAY

(71) Applicant: DELL PRODUCTS L.P., Round Rock, TX (US)

(72) Inventors: Guentaek Oh, Hillview (SG); Yonggu Kang, Singapore (SG)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 17/863,911

(22) Filed: Jul. 13, 2022

(51) Int. Cl.
| | |
|---|---|
| *G02F 1/16766* | (2019.01) |
| *G02F 1/1368* | (2006.01) |
| *G02F 1/1335* | (2006.01) |
| *G03B 11/04* | (2021.01) |
| *G02F 1/1685* | (2019.01) |

(52) U.S. Cl.
CPC ........ *G02F 1/16766* (2019.01); *G02F 1/1368* (2013.01); *G02F 1/133514* (2013.01); *G02F 1/1685* (2019.01); *G03B 11/045* (2013.01); *G02F 2201/44* (2013.01)

(58) Field of Classification Search
CPC .................................................. G02F 1/16766
See application file for complete search history.

(56) References Cited

U.S. PATENT DOCUMENTS

| | | |
|---|---|---|
| 7,140,550 B2 | 11/2006 | Ramachandran |
| 7,353,988 B1 | 4/2008 | Ramachandran |
| 2022/0163854 A1* | 5/2022 | Mochizuki ........... G03B 11/045 |

* cited by examiner

*Primary Examiner* — Edmond C Lau
(74) *Attorney, Agent, or Firm* — Larson Newman, LLP (57) ABSTRACT

An LCD panel includes an image capture device having an aperture, thin-film transistor layer, and an electronic ink reservoir. The thin-film transistor layer includes a first portion to provide an image on the LCD panel, a second portion, and a third portion. The second portion corresponds with the aperture, and the third portion immediately surrounds the second portion. The electronic ink reservoir is located proximate to the second and third portions of the thin-film transistor layer, and includes an electronic ink charged with a first charge state. The LCD panel directs the second portion of the thin-film transistor layer to provide a first electrical stimulus in a second charge state opposite to the first charge state to attract the electronic ink to the aperture to form a shutter for the image capture device and to block the aperture.

20 Claims, 8 Drawing Sheets

Charge Pattern

Charge Pattern

Shutter (Closed)

Shutter

Charge Pattern

Charge Pattern

Shutter

*FIG. 5C*

Shutter

ADVANCED E-SHUTTER SYSTEM WITH E-INK LAYER FOR EMBEDDED CAMERA DISPLAY

FIELD OF THE DISCLOSURE

This disclosure generally relates to information handling systems, and more particularly relates to providing an advanced e-shutter with an e-ink layer for an embedded camera in a display device of an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An LCD panel may include an image capture device having an aperture, thin-film transistor layer, and an electronic ink reservoir. The thin-film transistor layer may include a first portion to provide an image on the LCD panel, a second portion, and a third portion. The second portion may correspond with the aperture, and the third portion may immediately surround the second portion. The electronic ink reservoir may be located proximate to the second and third portions of the thin-film transistor layer, and may include an electronic ink charged with a first charge state. The LCD panel may direct the second portion of the thin-film transistor layer to provide a first electrical stimulus in a second charge state opposite to the first charge state to attract the electronic ink to the aperture to form a shutter for the image capture device and to block the aperture.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
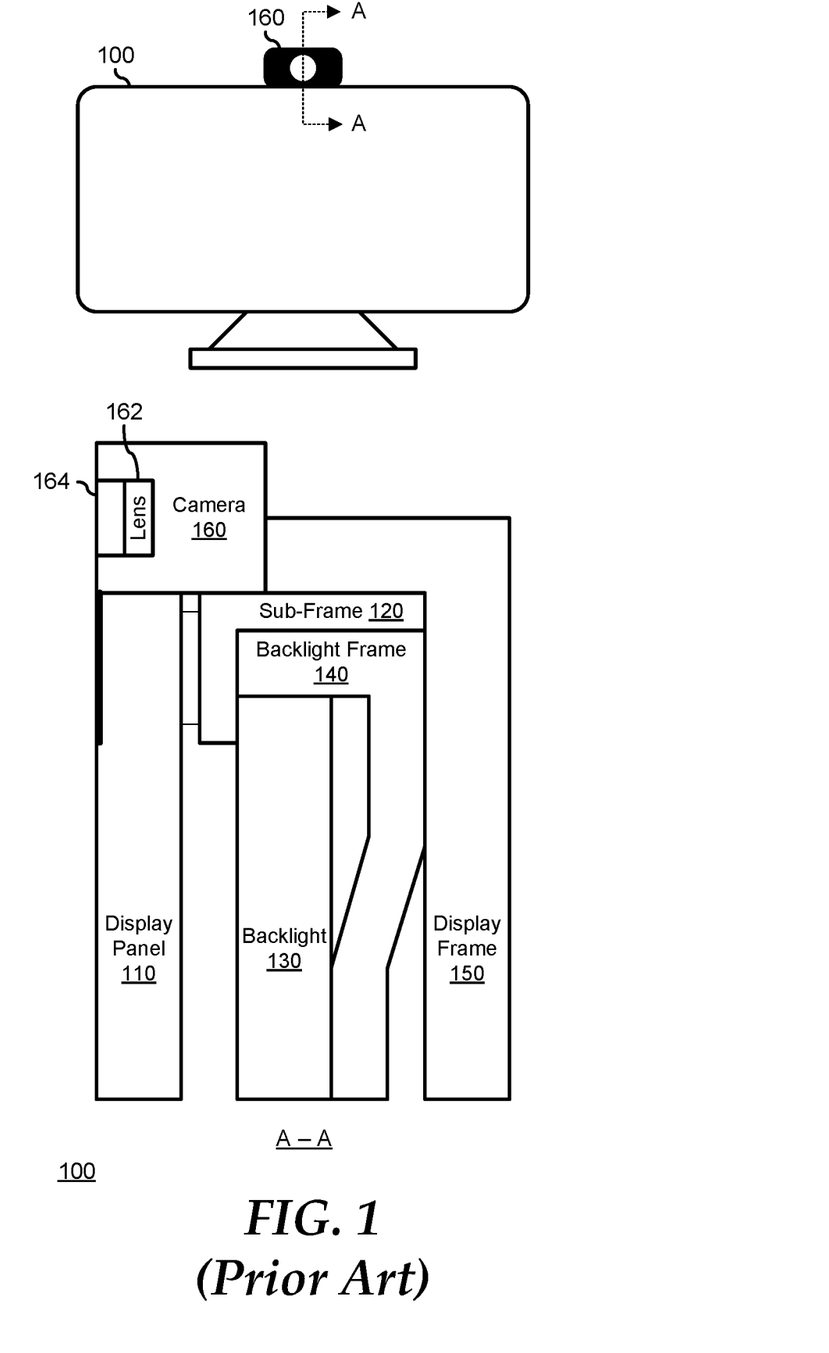
FIG. 1 is a cut-away diagram of a display according to the prior art.

FIG. 1 illustrates a display 100 and a cut-away view A-A of the display, as may be known in the prior art. Display 100 represents a device for projecting visual information, and may include a computer monitor, an outdoor display, a laptop or tablet display screen, a cellular phone device display screen, or other display, as needed or desired. As illustrated display 100 is represented as a liquid crystal display (LCD) device, but may also be a light emitting diode (LED) display such as an organic LED (OLED) display, a plasma display panel (PDP) display, a quantum dot LED (QLED) display, or the like.

Display 100 includes a panel 110, a panel subframe 120, a backlight assembly 130, a backlight frame 140, a display frame 150, and a camera/video device 160. Display panel 110 represents an LCD device and typically includes a top polarizer film, a display panel device, and a bottom polarizer film. The top polarizer film typically includes a printed portion on a bottom surface of the top polarizer film, that is, on a surface adjacent to the display panel device. The printed portion is a darkened portion of the top polarizer film that provides a distinct edge for display panel 110. Display panel 110 may be provided by a display manufacturer as an assembled unit, or the display panel and polarizer films may be provided separately, and assembled into the display panel assembly by a manufacturer of display 100, as needed or desired. The details of display panel assembly, both in terms of its manufacture and use in projecting visual information are known in the art, and will not be further described herein, except as needed to illustrate the current embodiments.

Display panel 110 is affixed to panel subframe 120 by a strip of double-sided tape around the perimeter of the display panel that adheres the bottom edge of the display panel to the panel subframe. Backlight assembly 130 provides the light source for display panel 110, and is affixed to backlight frame 140, and may further provide a mounting assembly for affixing panel subframe 120 to the backlight frame. Display frame 150 provides a rigid mounting structure for the assemblage of display panel 110, panel subframe 120, backlight assembly 130, and backlight frame 140. Camera/video device 160 represents a device that is configured to gather visual information from a field of view in front of display 100. As illustrated, camera/video device 160 is housed in a portion of display 100 that extends above a top limit of display panel 110. In a particular embodiment, display frame 150 extends around camera/video device 160 to provide a housing for the camera/video device. Display 100 may include a protective cover, as needed or desired.

Display 100 is characterized as having a particular bezel width, that is, an area at the edge of the display that is not usable for the projection of visual information. The bezel width is the width between the outer edge of display frame 150 and the inner edge of the printed portion on the top polarizer film. Design trends for displays such as display 100 are focused on minimizing the bezel width in order to be able to mount multiple displays together and provide a seamless visual display across the multiple displays. In this regard, a monitor or other type of display similar to display 100 is not amenable to the stacking of multiple monitors or display type devices into a larger image projecting system, because, to the extent that camera/video device 160 protrudes above the extent of the display panel, the effective width of the bezel of display 100 is increased on the top side of the display. As such, any horizontal gaps between stacked monitors or display type devices is increased, leading to an undesirable visual artifact in the image projected by the larger image projecting system.

Camera/video device 160 includes a lens 162 and a shutter 146. Lens 162 provides a focus within an aperture that provides a field of view in front of the camera/video device. Shutter 164 represents a mechanism that selectively blocks or unblocks the field of view in front of lens 162. In this regard, shutter 164 may represent a mechanism that enhances the security of the user of display 100. For example, where applications instantiated on an information handling system associated with display 100 are increasingly gaining access to the images from camera/video device 160, it becomes increasingly unclear to the user exactly when an image is being captured by the camera/video device. In such cases, the user may override the ability to capture images without having to individually disable image capturing by all of the relevant applications, but may engage shutter 164 to block the field of view in front of lens 162. Shutter 164 may represent an electrically activated mechanism, a manually activated mechanism, or the like, and may be incorporated into the design of display 100, or may be added on as an after-market device, as needed or desired.

In other embodiments, a display may include a camera/video device that extends from the display frame when needed, and that recedes back into the display frame when not is use. While such a display resolves the issue of the wider bezel of display 100, and acts as a de facto shutter for the camera/video device, the use of a pop-up camera/video device results in a thicker display which may not be suitable for compact use cases such as laptop computers, tablet devices, smart phone devices, and the like. Moreover, a pop-up camera/video device is more mechanically complex, and hence more costly to produce, and introduces an unnecessary point of failure in the pop-up mechanism.

Figure 2:
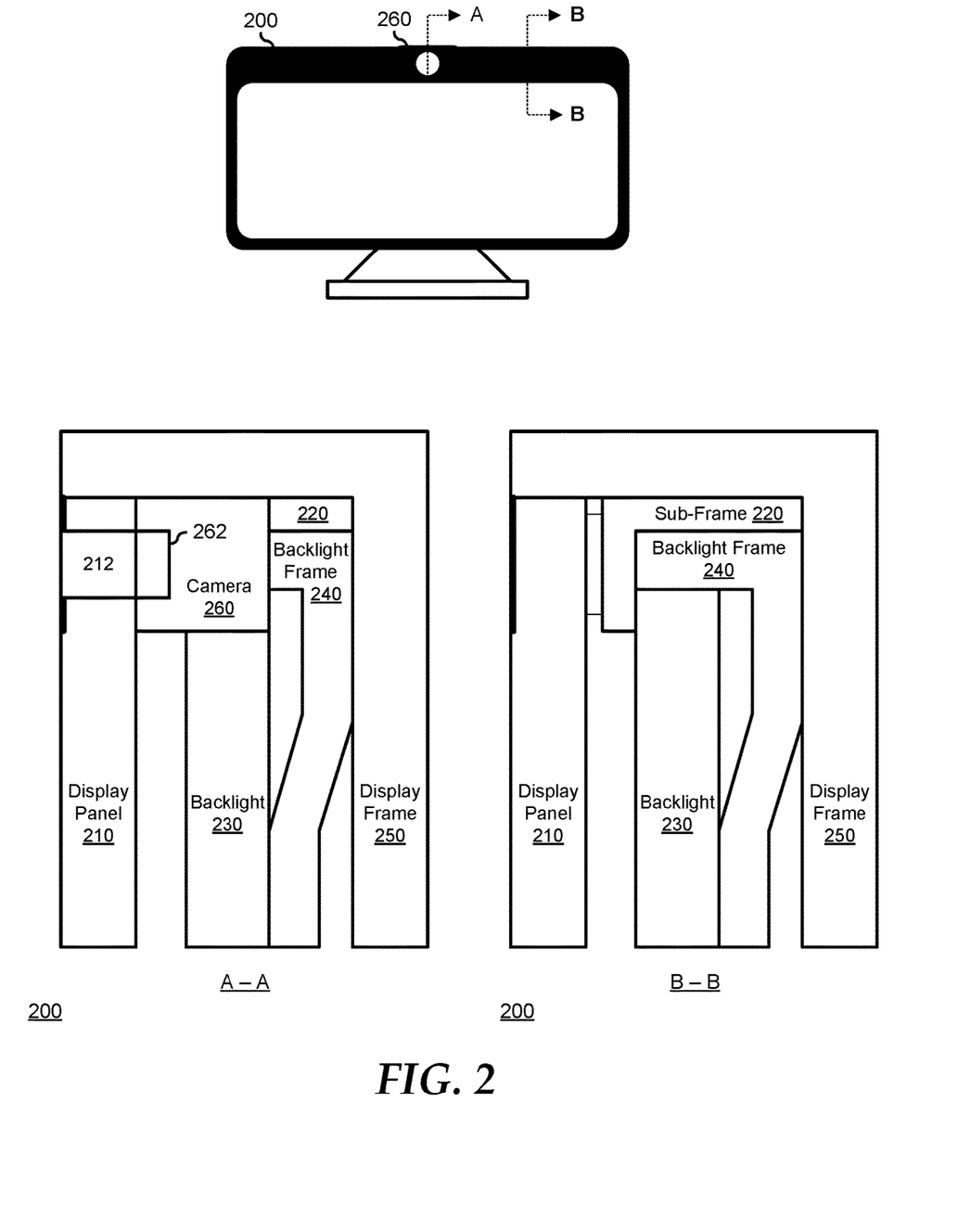
FIG. 2 is a first cut-away diagram and a second cut-away diagram of a display according to an embodiment of the current disclosure.

FIG. 2 illustrates a display 200 and cut-away portions A-A and B-B of the display, according to an embodiment of the current disclosure. Display 200 is similar to display 100, representing a device for projecting visual information, and may include a computer monitor, an outdoor display, a laptop or tablet display screen, a cellular phone device display screen, or other display, as needed or desired. Display 200 may represent a LCE display, a LED display, a PDP display, a QLED display, or the like, and the teachings of the present disclosure will be understood by the skilled artisan to be broadly adaptable to various display technologies, as needed or desired.

Display 200 includes a display panel 210, a backlight assembly 230, a backlight frame 240, a display frame 250, and a camera/video device 260. Unless otherwise noted the elements of display 200 are similar to the associated elements of display 100 (that is, display panel 210 is similar to display panel 110, etc.). In cut-away portions A-A and B-B, display 200 is revealed to have the narrow bezel associated with displays with no camera/video device. Hence display 200 may be understood to be amendable to stacking of multiple similar displays to form a larger image projecting system, without suffering from the enlarged horizontal gap as may result from the stacking of displays like display 100. This may be understood in the illustration of cut-away portion A-A, where camera/video device 260 is shown as being located behind display panel 210, and wholly within the confines of display frame 150. Camera/video device 160 may be affixed within display 100 by attachment to subframe 220, to backlight frame 240, to display frame 150, or to a combination thereof, as needed or desired.

Figure 3:
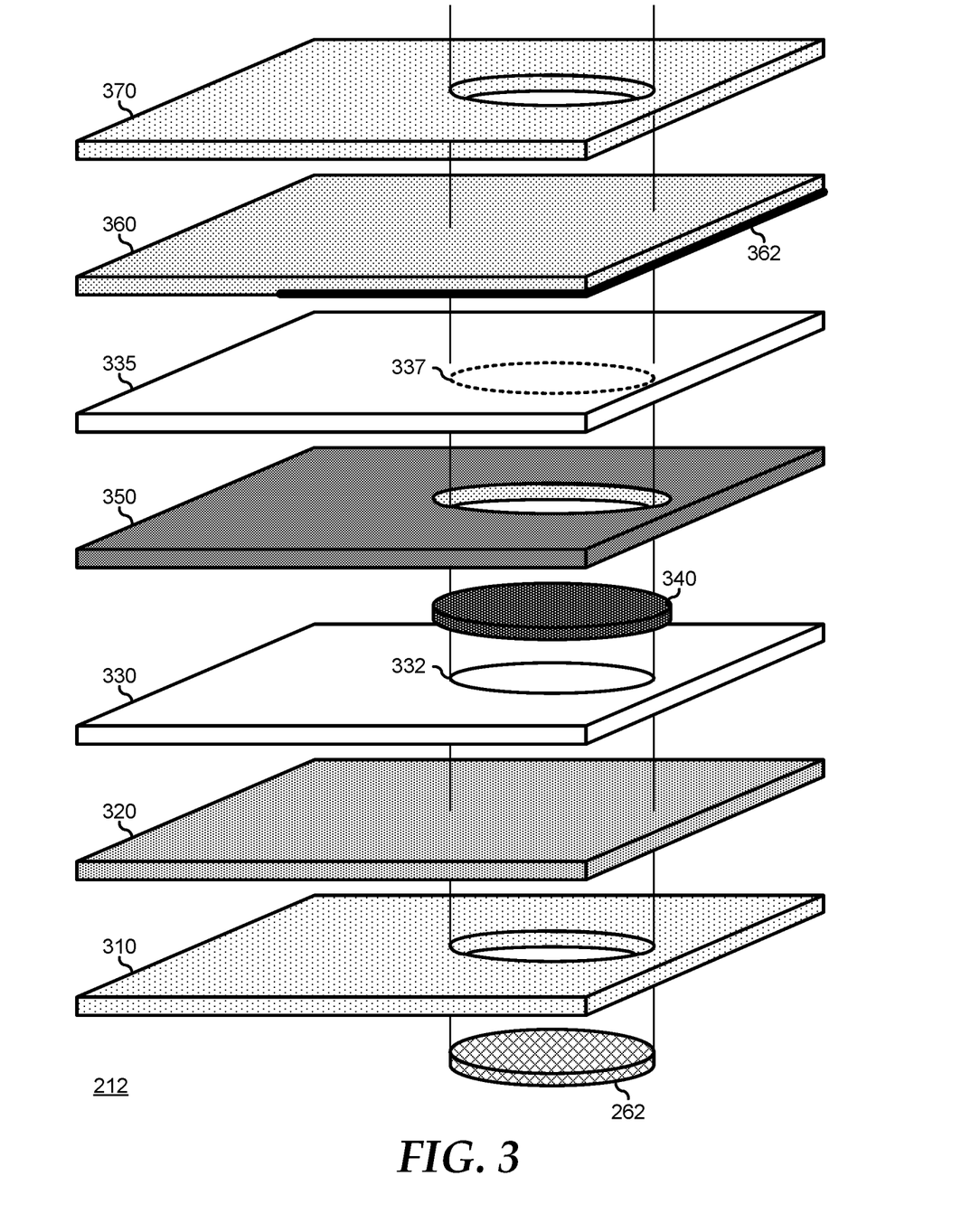
FIG. 3 is a layer diagram of a display panel of the display of FIG. 2.

To accommodate the placement of camera 260 behind display panel 210, the display panel is fabricated with a camera passthrough section 212, as depicted in cut-away portion A-A. Camera passthrough section 212 includes an electronic shutter function implemented utilizing electronic ink, as described further below. FIG. 3 illustrates an exemplary stack-up of section 212, including a back polarizer film 310, a thin-film transistor (TFT) layer 320, an Indium-Tin-Oxide (ITO) layer 330, an electronic ink reservoir 340, a liquid crystal layer 350, another ITO layer 335, a color filter layer 360 including a partial black matrix layer 362, and a front polarizer film 370. In areas of display panel 210 that are not proximate to camera/video device 260, the layers of the display panel operate in accordance with their typical function, and the functions, the details of which are known in the art, and will not be further described herein, except as needed to illustrate the current embodiments. Moreover, the type of display panel utilized in conjunction with the teachings of the current disclosure are not limited to the illustrated LCD-type display panel, but the teachings herein may be utilized in conjunction with any other type of display panel, as needed or desired. As such, the layers of camera passthrough section 212 provide their typical functions and features as may be associated with a typical LCD-type display panel, except as where clarified or elaborated upon in the current embodiments.

Camera passthrough section 212 is illustrated with camera lens 262 at the bottom, and with parallel lines radiating upward from the edges of the camera lens to illustrate the features of the layers of the camera passthrough section within an aperture that provides a field of view of the camera lens. Back polarizer film 310 is illustrated as extending into camera passthrough section 212, but as not extending into the aperture of camera lens 262, so as to not affect the light image within the field of view. As such, back polarizer film 310 can be fabricated with a hole in the film at a width of at least the width of camera lens 262. In another embodiment, back polarizer film 310 is thinner than front polarizer film 370. Here, back polarizer film 310 may not necessarily be fabricated with the hole in the film, as needed or desired.

TFT layer 320 and ITO layers 330 and 335 are typically transparent layers and so are not illustrated as including cut outs.

Moreover, as will be described below, TFT layer 320 and color filter layer 360 need to remain intact in order to activate electronic ink reservoir 340. ITO layer 330 includes a threshold bump 332 on a top surface of the ITO layer. Likewise ITO layer 335 includes a threshold bump 337 on a bottom surface of the ITO layer, as indicated by the dashed circle on the ITO layer. Threshold bumps 332 and 337 represent raised structures on the surfaces of respective ITO layers 330 and 335 that are formed of additional Indium-Tin-Oxide material, and are formed in a profile that matches the aperture of lens 262, as described further below. Threshold bumps 332 and 337 may be fabricated onto respective ITO layers 330 and 335 by etching the bulk regions of the ITO layers, leaving the raised threshold bumps, or by depositing additional Indium-Tin-Oxide material at the locations of the threshold bump, thereby raising the threshold bumps, as needed or desired.

Liquid crystal layer 350 includes a void that is wider than the aperture of camera lens 262, and, electronic ink reservoir 340 is fabricated into the void in the liquid crystal layer. Color filter layer 360 remains intact except that black matrix layer 362 is fabricated with a hole in the film at a width of at least the width of camera lens 262. Electronic ink layer 340 will be described further below. Front polarizer film 370 is illustrated as extending into camera passthrough section 212, but as not extending into the aperture of camera lens 262, so as to not affect the light image within the field of view. As such, front polarizer film 370 can be fabricated with a hole in the film at a width of at least the width of camera lens 262.

Figure 4:
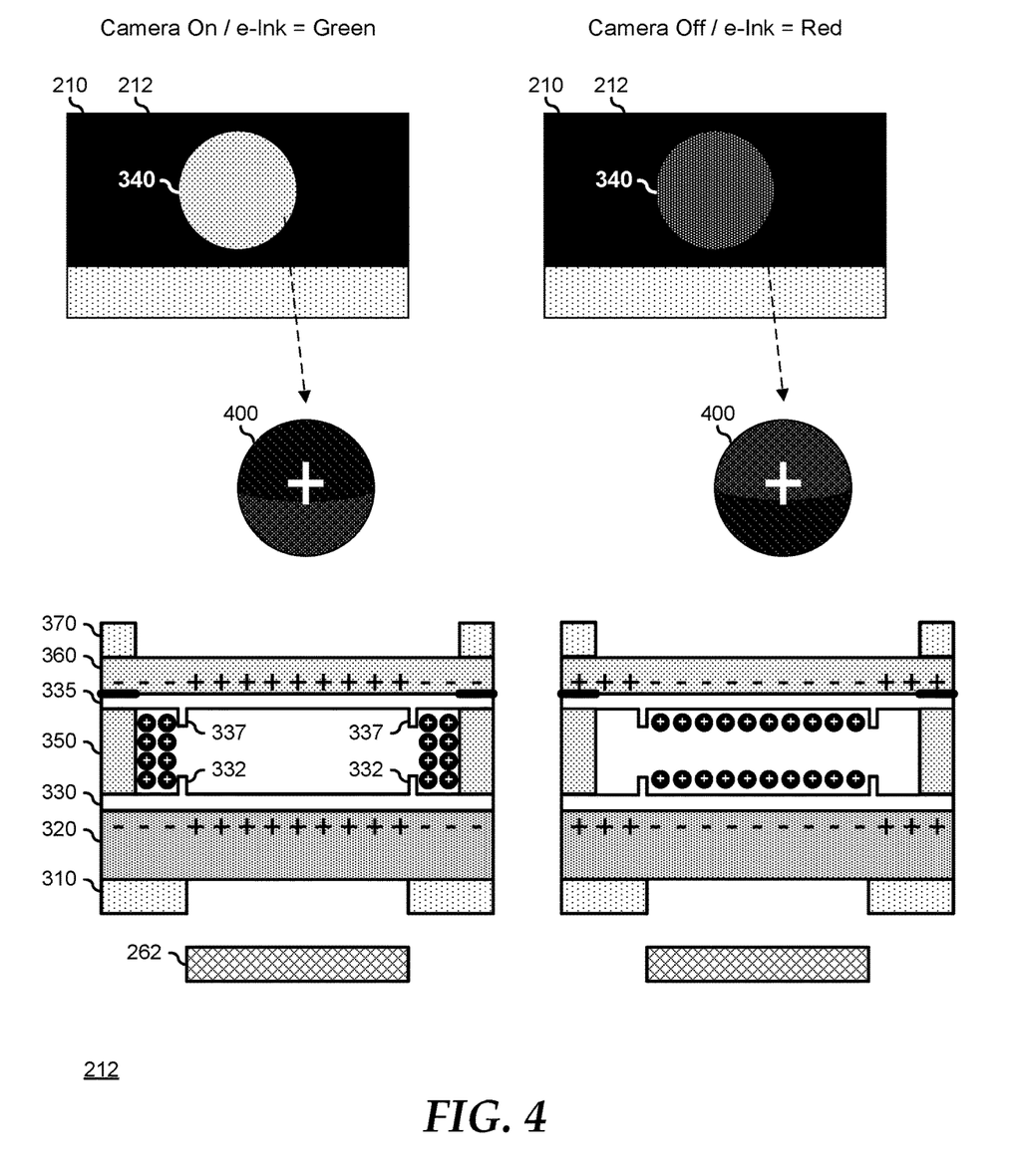
FIG. 4 is a diagram illustrating various states of the display of FIG. 2.

FIG. 4 illustrates the operation of display 200 as related to camera/video device 260 in operating modes including an "on" state and an "off" state. Here, the "on" and "off" states are associated with the operation of an electronic shutter implemented utilizing electronic ink, as described herein. Such a description of the "on" and "off" states may be provided in addition to, or in combination with other methods for turning a camera/video device on and off, such as by powering on and off the camera/video device, enabling or disabling data transactions with the camera/video device, or other method for turning a camera/video device on and off, as may be known in the art. Electronic ink reservoir 340 is a transparent sealed capsule that is filled with electronic ink particles 400. In the illustrated embodiment, electronic ink particles 400 represent particles that have their surfaces coated with a particular color, typically a black color. The particles are charged with and retain a positive charge. Thus, when the portions of TFT layer 320 and color filter layer 360 that surround electronic ink reservoir 340 are positively charged, the particles are repelled from those portions of the TFT layer and the color filter layer, and when the portions of the TFT layer and the color filter layer that surround the electronic ink reservoir are negatively charged, the particles are attracted to those portions of the TFT layer and the color filter layer.

In the left side of FIG. 4, camera/video device 260 is illustrated as being on, and the shutter formed by camera passthrough section 212 is open. To open the shutter, the portions of TFT layer 320 and color filter layer 360 outside of the aperture of lens 262 are negatively charged, attracting ink particles 400 to the edge of the aperture, and the portions of the TFT layer and the color filter layer proximate to the aperture are positively charged, repelling the ink particles from the aperture area. In this way, an unobstructed aperture is presented, and the shutter is "open." In the right side of FIG. 4, camera/video device 260 is illustrated as being off, and the shutter formed by camera passthrough section 212 is closed. To close the shutter, the portions of TFT layer 320 and color filter layer 360 outside of the aperture of lens 262 are positively charged, repelling ink particles 400 from the edge of the aperture, and the portions of the TFT layer and the color filter layer proximate to the aperture are negatively charged, attracting the ink particles to the aperture area. In this way, ink particles 400 obstruct the aperture, and the shutter is "closed." Threshold bumps 332 and 337 are provided to form a partial barrier and to encapsulate ink particles 400, either within the edge of the aperture of lens 262 when the shutter is open, or within the aperture when the shutter is closed. Display 200 may include control circuitry and logic as needed or desired to open and close the shutter by selectively controlling the relevant portions of TFT layer 320 and color filter layer 360.

Figure 5A:
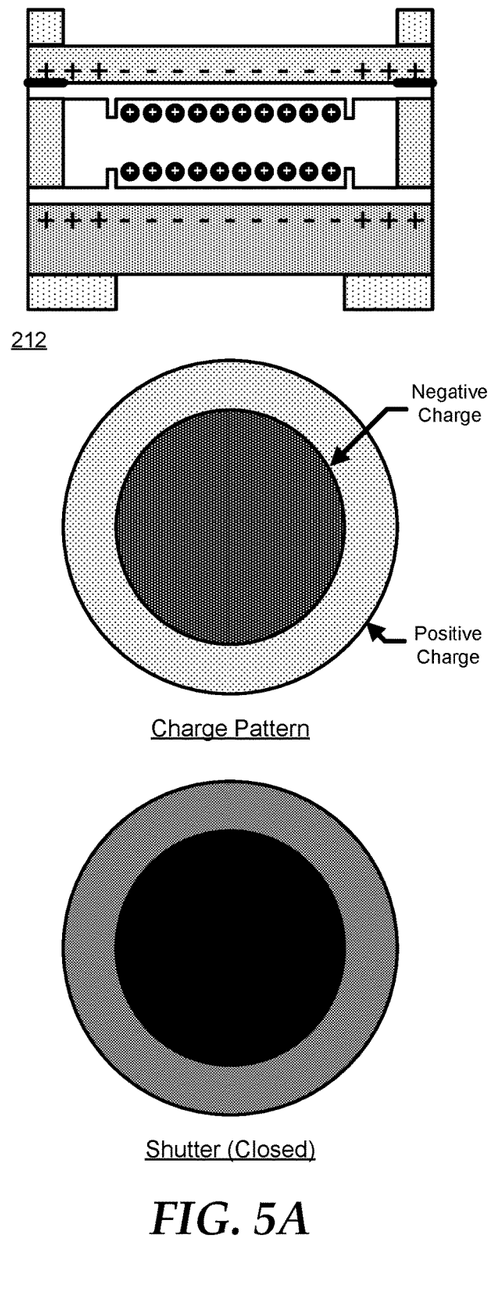
FIGS. 5A-5E are diagrams illustrating various states of a display similar to the display of FIG. 2 according to an embodiment of the current disclosure.
Figure 5B:
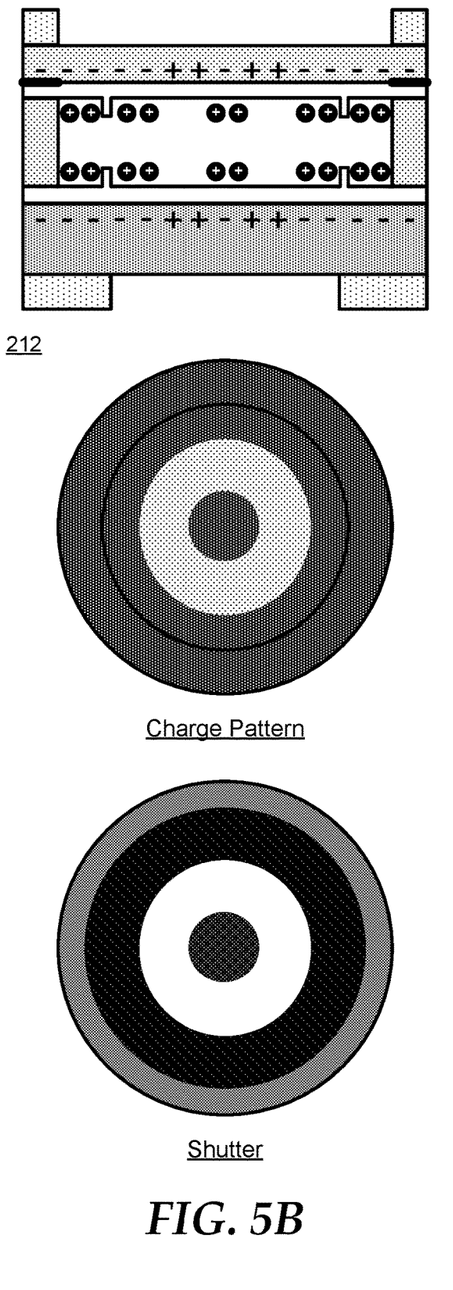

FIGS. 5A-E illustrate a time-space division driving method for opening the shutter formed by camera passthrough section 212. In particular, each of FIGS. 5A-E illustrate the layer stack-up of camera passthrough section 212 with various charge states on TFT layer 320 and color filter layer 360, a top-view of the associated charge pattern, and a top view of the associated shutter state. FIG. 5A illustrates the shutter in the closed state, as described above with regard to the left side of FIG. 4. The charge pattern shows a negative charge region in the area proximate to the aperture, and a positive charge region in the area surrounding the aperture. The shutter state is seen to be closed. FIG. 5B illustrates a first intermediate state where the transition from the closed state to the opened state is initiated. The area surrounding the aperture and a portion of the aperture area proximate to the edge are switched to a negative charge to begin attracting ink particles 400 into the edge region. Further, an inner disk area of the aperture is switched to a positive charge and an innermost circle of the aperture area remains negatively charged in order to avoid having all of ink particles 400 moving toward the edge at once, and clogging the gap between threshold bumps 332 and 337.

Figure 5C:
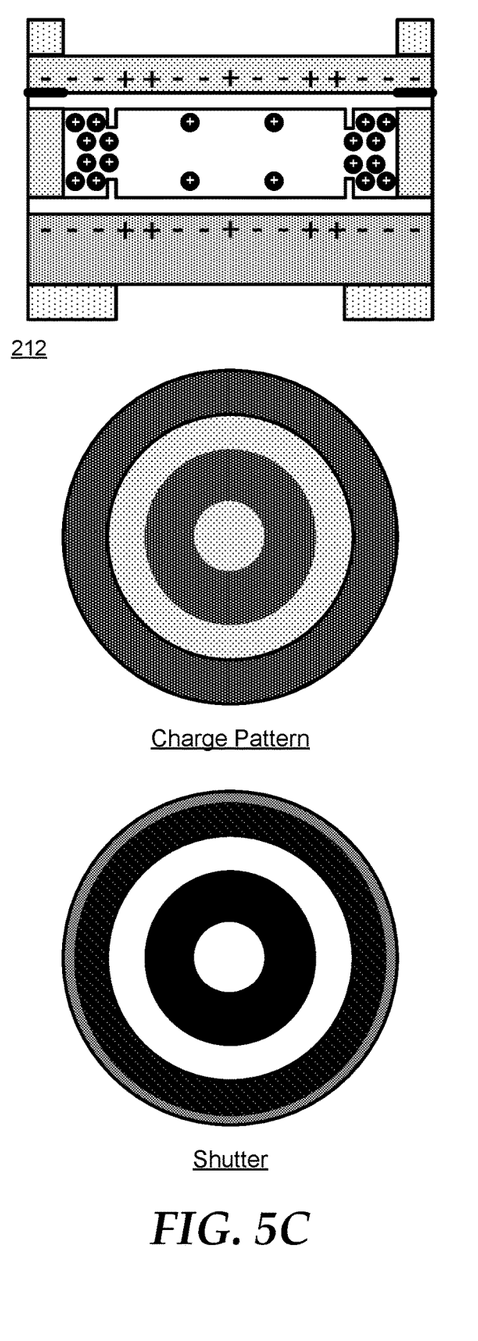
Figure 5D:
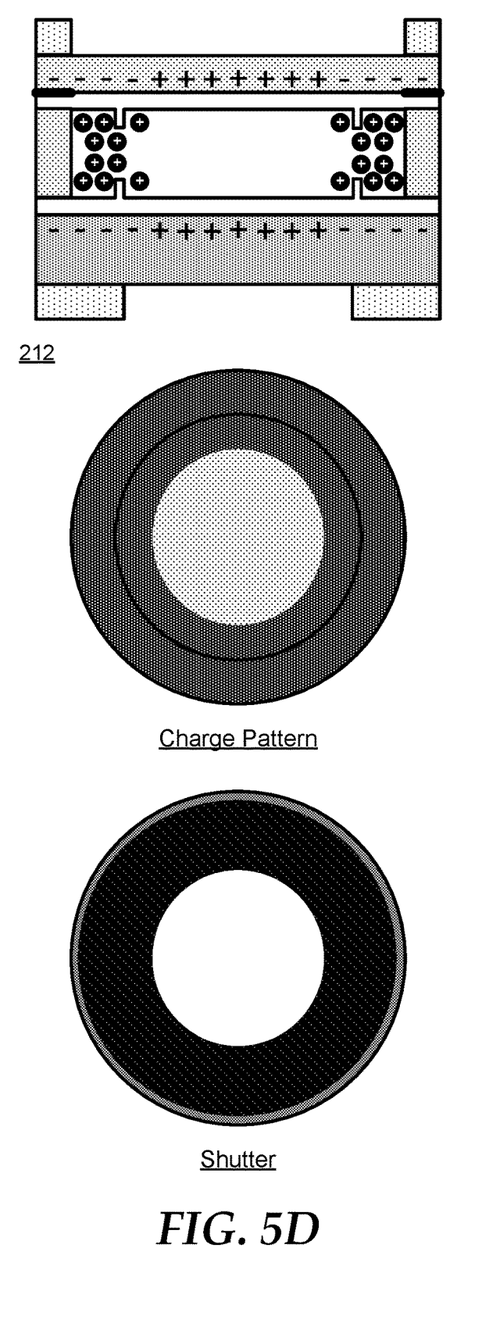
Figure 5E:
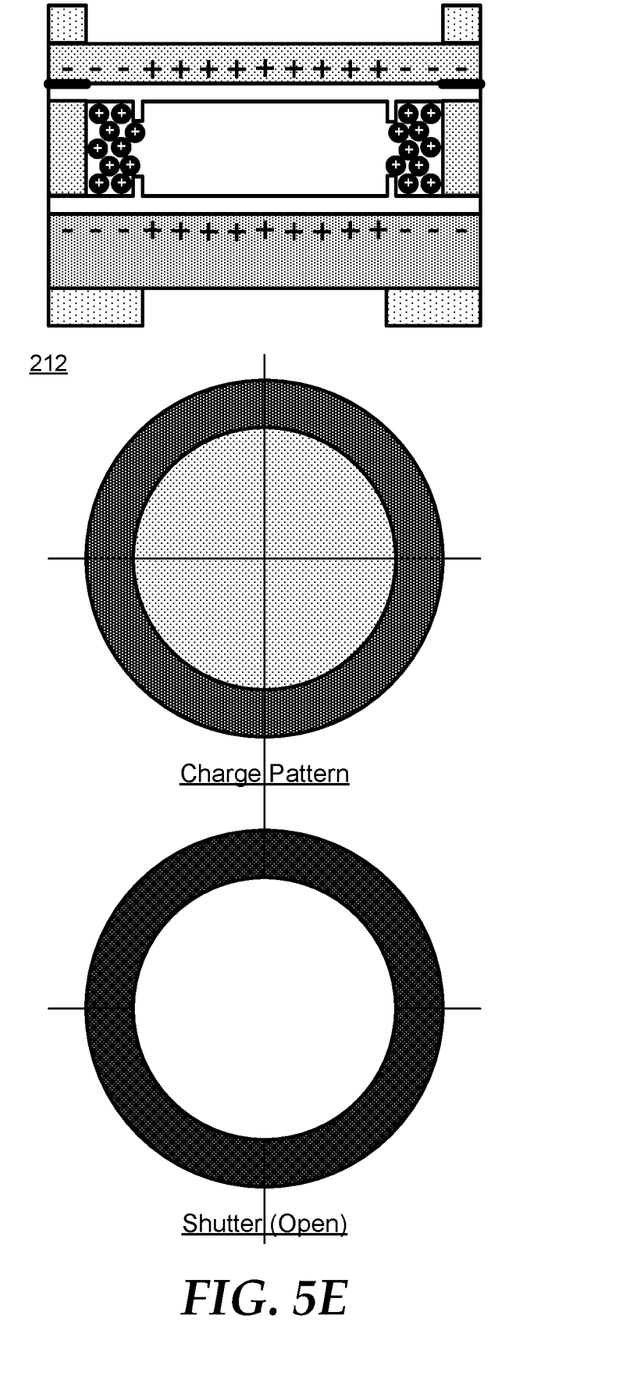

Here the shutter is "closed" at the edge of the aperture and in the middle of the aperture, but is "opened" in the region proximate to the disk of positive charge. In FIG. 5C, a second intermediate state is illustrated. Here, the disk of positive charge is expanded to continue driving the outer ink particles 400 outward and into the cavity surrounding the aperture. Further, a second, inner negatively charged disk region is formed with a positively charged inner circle. This second disk operates to move ink particles 400 from the middle of the aperture outward toward the cavity surrounding the aperture. FIG. 5D illustrates a third intermediate state where all of ink particles 400 from the outer region of the aperture have been fully transitioned to the cavity surrounding the aperture, and the ink particles from the inner portion of the aperture begin to fill the cavity. Finally, in FIG. 5E, the shutter is fully opened and is in the state illustrated with regard to the right side of FIG. 4.

The method of FIGS. 5A-E illustrates the separation of ink particles 400 into an outer portion and an inner portion, and moving the separate portions of the ink particle in successive waves based upon the charge states of TFT layer 320 and color filter layer 360. However, the method for opening the shutter formed by camera passthrough section 212 may separate ink particles 400 into more than two portions, as needed or desired. Further, the illustrations of FIGS. 5A-E may be provided as discrete steps, or may represent a smoother transition between the charge states as needed or desired. Further, a similar method may be utilized for transitioning between the open state and the closed state, as needed or desired.

Figure 6:
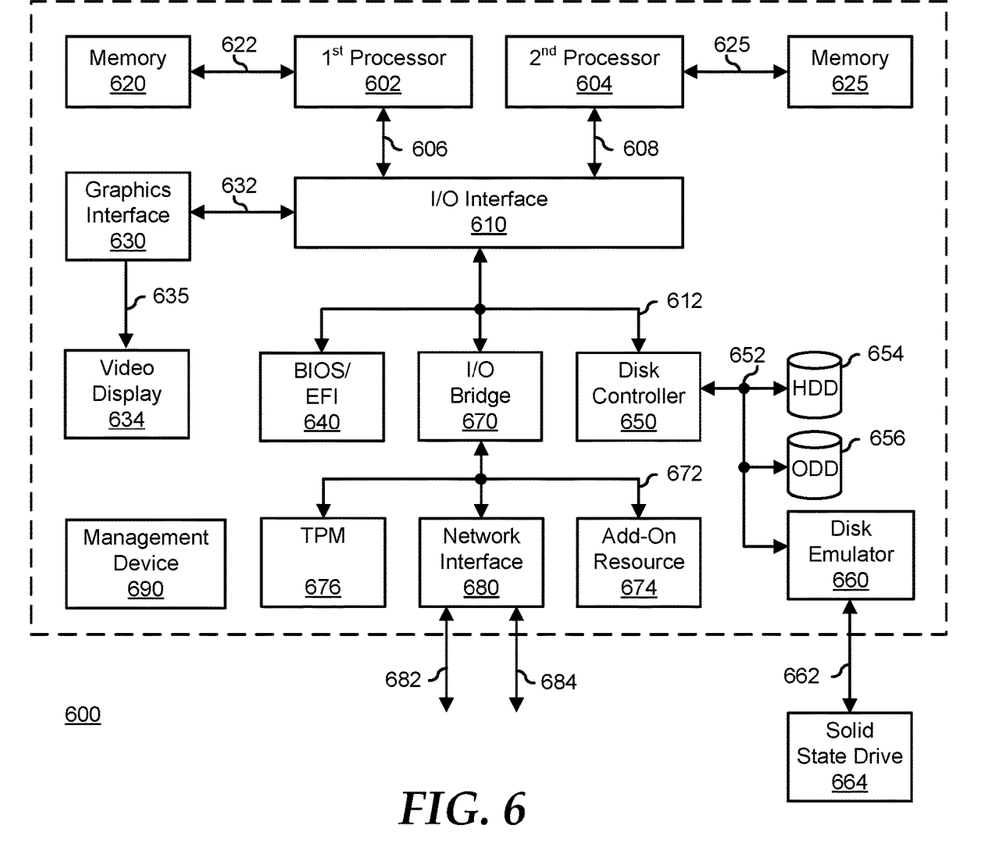
FIG. 6 is a block diagram illustrating a generalized information handling system according to another embodiment of the present disclosure.

FIG. 6 illustrates a generalized embodiment of an information handling system 600. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 600 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described below, and operates to perform one or more of the methods described below. Information handling system 600 includes a processors 602 and 604, an input/output (I/O) interface 610, memories 620 and 625, a graphics interface 630, a basic input and output system/universal extensible firmware interface (BIOS/UEFI) module 640, a disk controller 650, a hard disk drive (HDD) 654, an optical disk drive (ODD) 656, a disk emulator 660 connected to an external solid state drive (SSD) 662, an I/O bridge 670, one or more add-on resources 674, a trusted platform module (TPM) 676, a network interface 680, a management device 690, and a power supply 695. Processors 602 and 604, I/O interface 610, memory 620, graphics interface 630, BIOS/UEFI module 640, disk controller 650, HDD 654, ODD 656, disk emulator 660, SSD 662, I/O bridge 670, add-on resources 674, TPM 676, and network interface 680 operate together to provide a host environment of information handling system 600 that operates to provide the data processing functionality of the information handling system. The host environment operates to execute machine-executable code, including platform BIOS/UEFI code, device firmware, operating system code, applications, programs, and the like, to perform the data processing tasks associated with information handling system 600.

In the host environment, processor 602 is connected to I/O interface 610 via processor interface 606, and processor 604 is connected to the I/O interface via processor interface 608. Memory 620 is connected to processor 602 via a memory interface 622. Memory 625 is connected to processor 604 via a memory interface 627. Graphics interface 630 is connected to I/O interface 610 via a graphics interface 632, and provides a video display output 636 to a video display 634. In a particular embodiment, information handling system 600 includes separate memories that are dedicated to each of processors 602 and 604 via separate memory interfaces. An example of memories 620 and 630 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 640, disk controller 650, and I/O bridge 670 are connected to I/O interface 610 via an I/O channel 612. An example of I/O channel 612 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 610 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 640 includes BIOS/UEFI code operable to detect resources within information handling system 600, to provide drivers for the resources, initialize the resources, and access the resources. BIOS/UEFI module 640 includes code that operates to detect resources within information handling system 600, to provide drivers for the resources, to initialize the resources, and to access the resources.

Disk controller 650 includes a disk interface 652 that connects the disk controller to HDD 654, to ODD 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits SSD 664 to be connected to information handling system 600 via an external interface 662. An example of external interface 662 includes a USB interface, an IEEE 1394 (Firewire) interface, a proprietary interface, or a combination thereof. Alternatively, solid-state drive 664 can be disposed within information handling system 600.

I/O bridge 670 includes a peripheral interface 672 that connects the I/O bridge to add-on resource 674, to TPM 676, and to network interface 680. Peripheral interface 672 can be the same type of interface as I/O channel 612, or can be a different type of interface. As such, I/O bridge 670 extends the capacity of I/O channel 612 when peripheral interface 672 and the I/O channel are of the same type, and the I/O bridge translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as I/O interface 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Management device 690 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 600. In particular, management device 690 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 600, such as system cooling fans and power supplies. Management device 690 can include a network connection to an external management system, and the management device can communicate with the management system to report status information for information handling system 600, to receive BIOS/UEFI or system firmware updates, or to perform other task for managing and controlling the operation of information handling system 600. Management device 690 can operate off of a separate power plane from the components of the host environment so that the management device receives power to manage information handling system 600 when the information handling system is otherwise shut down. An example of management device 690 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 690 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A liquid crystal display (LCD) panel, comprising:
   an image capture device having an aperture;
   a thin-film transistor layer including a first portion to provide an image on the LCD panel, a second portion, and a third portion, wherein the second portion corresponds with the aperture, and wherein the third portion immediately surrounds the second portion; and
   an electronic ink reservoir located proximate to the second and third portions of the thin-film transistor layer, the electronic ink reservoir including an electronic ink charged with a first charge state;
   wherein the LCD panel is configured in a first state to direct the second portion of the thin-film transistor layer to provide a first electrical stimulus in a second charge state opposite to the first charge state to attract the electronic ink to the aperture to form a shutter for the image capture device and to block the aperture.

2. The LCD panel of claim 1, wherein the LCD panel is further configured in the first state to direct the third portion of the thin-film transistor layer to provide a second electrical stimulus in the first charge state to repel the electronic ink from the third portion to the aperture.

3. The LCD panel of claim 2, wherein the LCD panel is further configured in a second state to direct the second portion of the thin-film transistor layer to provide the first electrical stimulus in the first charge state to repel the electronic ink from the aperture to unblock the aperture.

4. The LCD panel of claim 3, wherein the LCD panel is further configured in the second state to direct the third portion of the thin-film transistor layer to provide the second electrical stimulus in the second charge state to attract the electronic ink to the third portion.

5. The LCD panel of claim 4, further comprising a color filter layer including a fourth portion to provide the image on the LCD panel, a fifth portion, and a sixth portion, wherein the fifth portion corresponds with the aperture, and wherein the sixth portion immediately surrounds the second portion.

6. The LCD panel of claim 5, wherein the LCD panel is further configured in the first state to direct the fifth portion of the color filter layer to provide a third electrical stimulus in the second charge state to further attract the electronic ink to the aperture.

7. The LCD panel of claim 6, wherein the LCD panel is further configured in the first state to direct the sixth portion of the color filter layer to provide a fourth electrical stimulus in the first charge state to further repel the electronic ink from the sixth portion to the aperture.

8. The LCD panel of claim 7, wherein the LCD panel is further configured in the second state to direct the fifth portion of the color filter layer to provide the third electrical stimulus in the first charge state to further repel the electronic ink from the aperture.

9. The LCD panel of claim 8, wherein the LCD panel is further configured in the second state to direct the sixth portion of the color filter layer to provide the fourth electrical stimulus in the second charge state to further attract the electronic ink to the third portion.

10. The LCD panel of claim 4, wherein the LCD panel is further configured in a transition time between the first state and the second state to provide time-space varying electrical stimulus in the third and fourth portions of the thin-film transistor layer to remove the electronic ink from the aperture.

11. A method, comprising:
providing, in a liquid crystal display (LCD) panel, an image capture device having an aperture;
providing a thin-film transistor layer including a first portion to provide an image on the LCD panel, a second portion, and a third portion, wherein the second portion corresponds with the aperture, and wherein the third portion immediately surrounds the second portion;
providing an electronic ink reservoir proximate to the second and third portions of the thin-film transistor layer, the electronic ink reservoir including an electronic ink charged with a first charge state;
directing, in a first state, the second portion of the thin-film transistor layer to provide a first electrical stimulus in a second charge state opposite to the first charge state to attract the electronic ink to the aperture to form a shutter for the image capture device and to block the aperture.

12. The method of claim 11, further comprising directing, in the first state, the third portion of the thin-film transistor layer to provide a second electrical stimulus in the first charge state to repel the electronic ink from the third portion to the aperture.

13. The method of claim 12, further comprising directing, in a second state, the second portion of the thin-film transistor layer to provide the first electrical stimulus in the first charge state to repel the electronic ink from the aperture to unblock the aperture.

14. The method of claim 13, further comprising directing, in the second state, the third portion of the thin-film transistor layer to provide the second electrical stimulus in the second charge state to attract the electronic ink to the third portion.

15. The method of claim 14, further comprising providing a color filter layer including a fourth portion to provide the image on the LCD panel, a fifth portion, and a sixth portion, wherein the fifth portion corresponds with the aperture, and wherein the sixth portion immediately surrounds the second portion.

16. The method of claim 15, further comprising directing, in the first state, the fifth portion of the color filter layer to provide a third electrical stimulus in the second charge state to further attract the electronic ink to the aperture.

17. The method of claim 16, further comprising directing, in the first state, the sixth portion of the color filter layer to provide a fourth electrical stimulus in the first charge state to further repel the electronic ink from the sixth portion to the aperture.

18. The method of claim 17, further comprising directing, in the second state, fifth portion of the color filter layer to provide the third electrical stimulus in the first charge state to further repel the electronic ink from the aperture.

19. The method of claim 18, further comprising directing, in the second state, the sixth portion of the color filter layer to provide the fourth electrical stimulus in the second charge state to further attract the electronic ink to the third portion.

20. A shutter for an image capture device of a display panel, the shutter comprising:
a thin-film transistor layer of the display panel, the thin-film transistor layer including a first portion to provide an image on the LCD panel, a second portion, and a third portion, wherein the second portion corresponds with an aperture of the image capture device, and wherein the third portion immediately surrounds the second portion; and
an electronic ink reservoir proximate to the second and third portions of the thin-film transistor layer, the electronic ink reservoir including an electronic ink charged with a first charge state;
wherein the LCD panel is configured in a first state to direct the second portion of the thin-film transistor layer to provide a first electrical stimulus in a second charge state opposite to the first charge state to attract the electronic ink to the aperture to form the shutter and to block the aperture.

* * * * *